(12) United States Patent
Clark

(10) Patent No.: US 6,582,291 B2
(45) Date of Patent: *Jun. 24, 2003

(54) WINDJET TURBINE

(76) Inventor: Thomas L. Clark, 2809 Rio Branco, Suite 102-D, Dallas, TX (US) 75234

( * ) Notice: Subject to any disclaimer, the term of this patent is extended or adjusted under 35 U.S.C. 154(b) by 0 days.

This patent is subject to a terminal disclaimer.

(21) Appl. No.: 10/022,600

(22) Filed: Dec. 17, 2001

(65) Prior Publication Data

US 2002/0068519 A1 Jun. 6, 2002

Related U.S. Application Data

(62) Division of application No. 09/523,258, filed on Mar. 10, 2000, now Pat. No. 6,352,473.

(51) Int. Cl.$^7$ ................................................ F23L 17/10
(52) U.S. Cl. ......................................................... 454/19
(58) Field of Search ...................................... 454/18, 19

(56) References Cited

U.S. PATENT DOCUMENTS

| | | |
|---|---|---|
| 1,857,762 A | 5/1932 | Meadows |
| 1,977,934 A | 10/1934 | Bolton |
| 2,013,244 A | 9/1935 | LaVergne |
| 2,469,096 A | 5/1949 | Wilson |
| 3,460,855 A | 8/1969 | Belden |
| 3,797,374 A | 3/1974 | Jones |
| 3,893,383 A | 7/1975 | Jones |
| 3,952,638 A | 4/1976 | Felter et al. |
| 4,086,028 A | 4/1978 | Felter |
| 4,303,375 A | 12/1981 | Foglesong et al. |
| 4,379,972 A | 4/1983 | Sosa et al. |
| 4,641,571 A | 2/1987 | Anderson et al. |
| 4,648,312 A | 3/1987 | Schad |
| 4,759,272 A | 7/1988 | Zaniewski |
| 4,831,921 A | 5/1989 | Potter |
| 5,326,313 A | 7/1994 | Miniat |
| 5,332,354 A | 7/1994 | Lamont |
| 5,336,050 A | 8/1994 | Guida et al. |
| 5,447,412 A | 9/1995 | Lamont |
| 5,503,530 A | 4/1996 | Walters |
| 5,571,045 A | 11/1996 | Tsung |
| 5,664,418 A | 9/1997 | Walters |
| 6,302,778 B1 * | 10/2001 | Andrews et al. ............ 454/16 |

FOREIGN PATENT DOCUMENTS

| | | |
|---|---|---|
| GB | 21885 | of 1896 |
| GB | 26938 | of 1906 |
| JP | 45-15549 | 5/1970 |

* cited by examiner

Primary Examiner—Harold Joyce
(74) Attorney, Agent, or Firm—Dennis T. Griggs

(57) ABSTRACT

A roof-mounted wind turbine includes turbine vanes that are linear-shaped and do not have the conventional convex curvature. Additionally, the turbine vanes are made in common with one another or with a common turbine component, so that each vane does not require individual handling nor individual attachment to the turbine assembly as is required in the construction of conventional wind turbines that are commercially available today. This is accomplished by producing the vanes by molding or extruding techniques that are commonly used in making plastic assemblies or components.

7 Claims, 9 Drawing Sheets

WINDJET TURBINE

CROSS REFERENCE TO RELATED APPLICATION

This is a division of application Ser. No. 09/523,258 filed Mar. 10, 2000, U.S. Pat. No. 6,352,473.

BACKGROUND OF THE INVENTION

Wind-powered turbine ventilators are widely used for under-roof ventilation in domestic, commercial and industrial applications. Their popularity stems largely from a relatively modest purchase cost coupled with a substantial absence of any operating cost and ability to operate passively without regulation. The primary purpose of the turbine ventilator is to exhaust under-roof accumulation of hot air either internally generated or as a result of sun loading on the roof. For that purpose, a precise quantity of air flow need not be maintained continuously but can instead be permitted to fluctuate within a wide range.

Being wind powered, capacity fulfillment of the turbine ventilator to induce a forced air flow upward through a roof opening is dependent upon and will fluctuate extensively in correlation to ambient wind velocity. Continuous exposure to varying wind and rotational forces subjects the ventilator and its bearing supports to severe vibration and wear.

Conventional wind powered turbine ventilators are available in various sizes affording a rated flow capacity at a given wind velocity. Their construction usually includes a vaned head mounted for rotation relative to a stationary mounting bracket. The mounting bracket is configured for attachment onto a roof-mounted air flow conduit such as an adjustable sheet metal elbow fitting which is centered over a circular cut-out opening in direct communication with the space to be ventilated. In conventional turbine design, exterior bracing may be provided to aid in securing the turbine components relative to each other while an axially depending internal spindle in cooperation with a stationary sleeve provides a journalled support for rotation.

Conventional turbines include a stationary spindle, usually a metal rod or tube, that extends from a mounting bracket (located below the turbine base) up to the top of the turbine, or to the upper region of the turbine. The spindle is positioned vertically at the center of the turbine, often measuring approximately 10 inches in length, and the turbine rotates around it. The weight of the rotating turbine member is borne solely by the spindle. The turbine engages the spindle by a thrust bearing tip at the upper end of the spindle, and may include plastic bushings and ball bearings, all of which stabilize the turbine on its axis so that the turbine will spin freely in the wind.

Conventional turbine ventilators are disclosed in U.S. Pat. Nos. 3,392,659 and 3,590,720. Specific support structures for a variety of interlocking turbine components are disclosed in U.S. Pat. Nos. 3,179,367; 4,441,347 and 4,653,708.

Because of the rapidly rising costs of energy, the incentives to conserve energy are increasing, both for domestic users as well as industrial users. For most domestic users in the southern regions of the United States, home air conditioning accounts for a substantial portion of the annual energy expense. Although most dwellings are insulated, a substantial amount of energy is expended by the air conditioning compressor to pump the radiant heat absorbed by the dwelling structure out of the air conditioned living space and into the outside ambient air.

The air conditioning load is intensified by the thermal storage effect associated with the attic air space found in most dwellings. Air circulates very slowly in the attic air space so that its temperature rises rapidly as solar radiation is absorbed. As a result, a large amount of heat is transferred from the exposed roof structure to the air trapped within the attic air space. The body of air trapped in the attic space acts as a thermal reservoir which transfers heat through the ceiling and into the conditioned living space. Because of the large thermal mass associated with the attic air space and the roof structure, heat transfer through the ceiling and into the conditioned living space may continue for several hours after sundown.

The thermal oven effect of the trapped attic air may be reduced by the action of vents, roof turbines and attic ventilator fans which circulate the trapped air out of the attic space.

Traditionally, roof-mounted turbine ventilators are made of metal construction: steel or aluminum. Plastic bushings and/or ball bearing assemblies are commonly used to provide smooth rotating action. Turbine ventilators have been made this way for over 60 years with the only major innovation being the introduction of some units using ball bearings and plastic bushings, and some units using aluminum vane components instead of galvanized steel. Conventional metal turbines basically consist of an upper crown, riveted individual vane members, and a lower base with radial members that extend inward to support the lower region of the turbine and provide a housing for the lower bushing or ball bearing that engages, the spindle. Conventional turbines typically include 20 to 24 convex-shaped metal vane members, 8-inches in length extending from top to bottom of the turbine. In all of these commercially available turbines, the steel or aluminum vanes are individual, separate component members. Each vane has a rivet hole punched at the top of the vane and at the bottom of the vane for assembly purposes.

During the turbine manufacturing process, as many as twenty to twenty-four individual vanes are attached by rivet to a crown plate and a base collar. Handling each individual vane and riveting of each vane twice requires forty to fifty rivet fasteners and an equal number of rivet setting operations per turbine assembly. The curvature of these vanes is such that they bow out in a convex profile, with the assembled turbine having a globe-shaped silhouette.

With the current trend to form these vanes from thinner sheet metal stock to reduce the turbine weight, these globe-shaped products are easily dented. These light-weight turbines often take an impact while shipping in their corrugated container, or from a flying bird while affixed to the roof of a home resulting in a permanent and noticeable dent. Once this happens, the turbine will not spin true as it should. A dented turbine head will display a noticeable wobble as it rotates, lose some of its ventilating effectiveness and give the appearance of a flawed product. This conventional metal turbine design requires many separate assembly operations during its manufacture, and the finished product is very labor intensive.

SUMMARY OF THE INVENTION

The turbine head of the present invention includes an upper head assembly and a lower head assembly, with vane segments being integrally formed on the upper head assembly, and complementary vane segments being integrally formed on the lower head assembly. The lower head assembly and upper head assembly are separately molded, and are assembled together with the complementary vane segments being fitted together to complete the turbine head. A separate air scoop assembly including air scoop blades are attached to the turbine for drawing hot air from the attic space in response to turbine rotation due to wind action, and for inducing a turning moment in the turbine in response to the convection flow of hot air that rises from the attic space when ambient wind conditions are not sufficient to turn the turbine head.

Vertical section panels mounted within the turbine interior partition the rising exhaust air to evenly and uniformly distribute the exhaust air through exhaust ports located in vertical slots between adjacent vane members. An internal exhaust air diffuser cone directs exhaust air through the turbine to cause it to move in close proximity through a venturi passage, thus accelerating the flow of exhaust air and promoting the removal of exhaust air from the attic space. In the preferred embodiment, each turbine vane includes three segments, with two segments forming a pocket for capturing the incident ambient wind currents on one side of the turbine, while adjacent vane segments form a venturi passage for promoting the withdrawal of air through the opposite side of the turbine. A separate cover is removably attached to the crown portion of the turbine and provides a weather seal for the upper spindle and bearing assembly.

BRIEF DESCRIPTION OF THE DRAWING

The accompanying drawing is incorporated into and forms a part of the specification to illustrate the preferred embodiments of the present invention. Various advantages and features of the invention will be understood from the following detailed description taken in connection with the appended claims and with reference to the attached drawing figures in which:

DETAILED DESCRIPTION OF THE INVENTION

Figure 1:
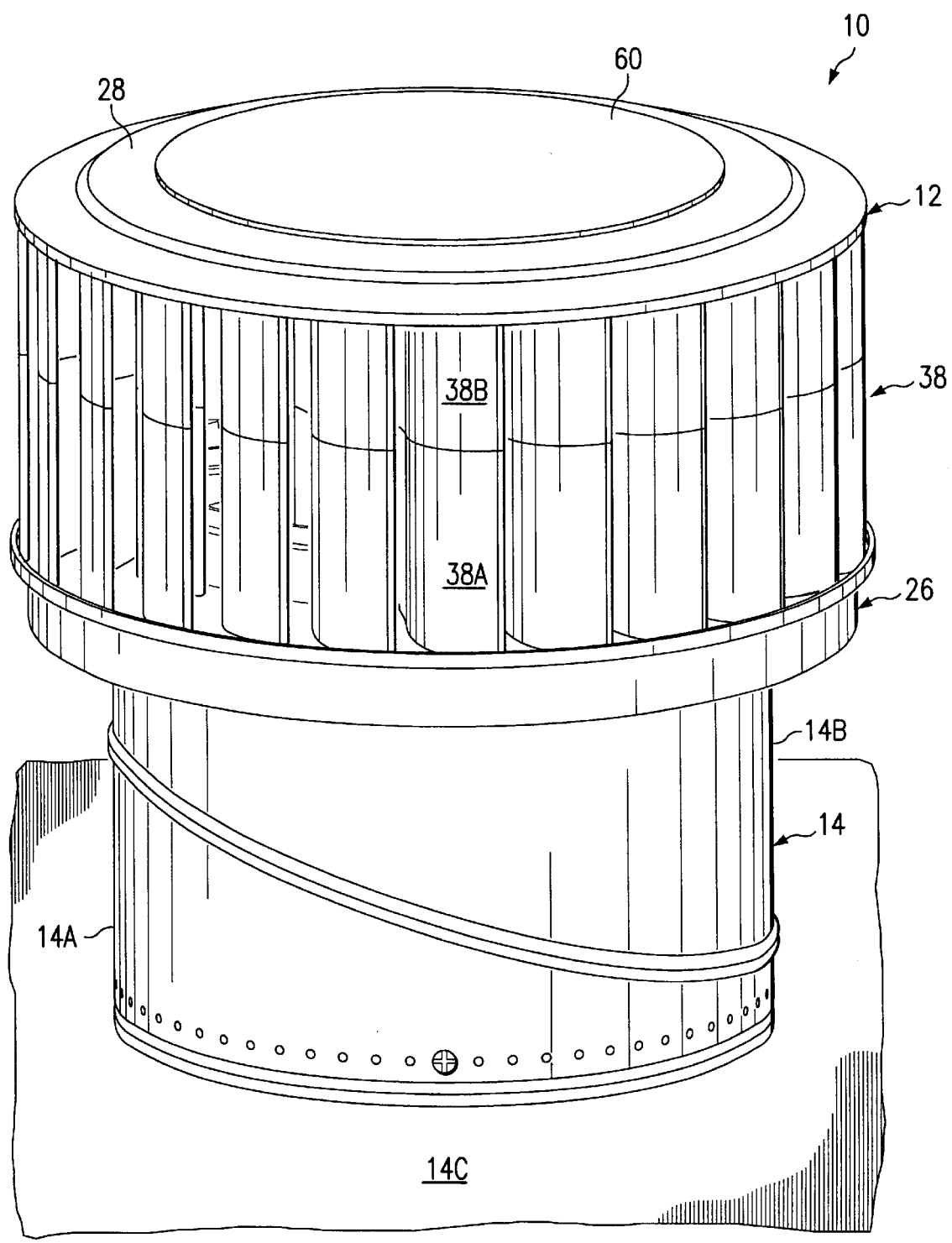
FIG. 1 is a perspective view of a turbine ventilator having a vaned turbine head constructed according to the present invention.

Preferred embodiments of the invention will now be described with reference to various examples of how the invention can best be made and used. Like reference numerals are used throughout the description and several views of the drawing to indicate like or corresponding parts.

Figure 2:
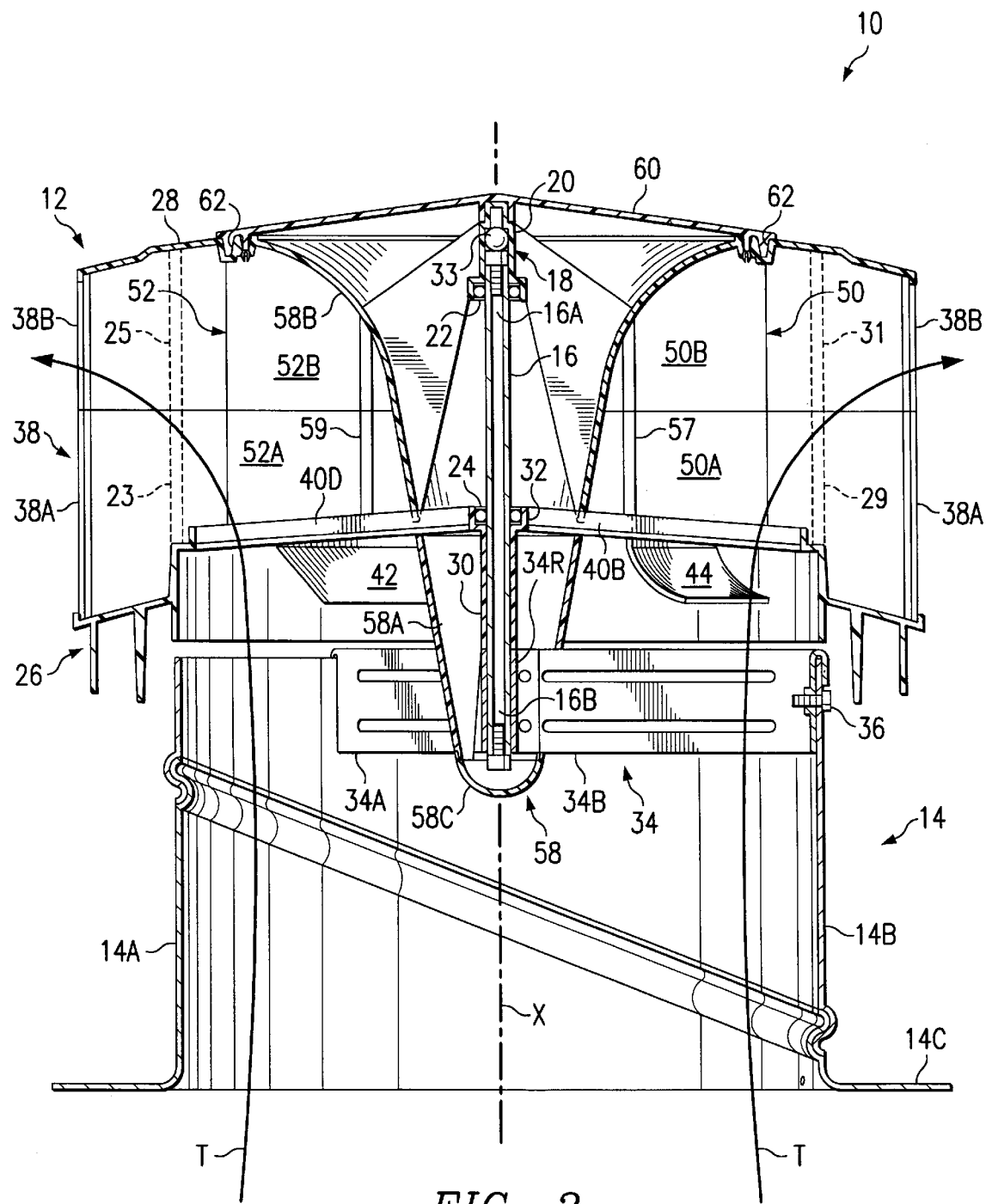
FIG. 2 is a sectional view thereof.

Referring now to FIG. 1 and FIG. 2, a roof-mountable turbine ventilator assembly 10 of the present invention has a vaned turbine rotor head 12 which is adapted for rotation about an adjustably sectioned tubular base 14, commonly referred to as an elbow fitting or airflow conduit, and a coaxial shaft or spindle 16. The turbine head 12 is supported on a rotatable thrust bearing 18. The thrust bearing 18 includes a thrust receptacle or cup 20 which receives the upper supporting or insertion end 16A of the spindle for supporting the turbine head for rotation relative to the airflow elbow conduit 14. The turbine head 12 is further rotatably coupled to the spindle 16 by an upper ball bearing assembly 22 which is mounted on the thrust receptacle 20, and a lower ball bearing assembly 24.

In the installation of the wind turbine 12 to a roof, first a 12-inch diameter hole is cut in the roof. The 12-inch size port is an industry standard. Affixed to the roof, directly above the 12" hole, is a 12" diameter adjustable air flow conduit, or elbow fitting 14 that is primarily cylindrical in shape and often constructed from galvanized sheet metal. The adjustable elbow fitting functions as an airflow conduit between the hole in the roof and the airflow inlet of the wind turbine 12. The elbow fitting includes cylindrical sections 14A, 14B that are rotatably coupled together and a mounting flange 14C which can be secured and flashed over a roof surface in which an exhaust hole has been cut.

The upper cylindrical section 14B can be rotated relative to the lower section 14A, so that it can be positioned in such a way that it accommodates the various pitches of roofs, and still can provide a level turbine mounting surface that allows the spindle of the turbine to be positioned in true perpendicular relation to the ground. In doing this, gravity is equally displaced on the turbine 12 allowing the turbine to spin freely in response to ambient wind flow. Hot air rises from the under the roof confines, through the hole in the roof, through the adjustable elbow fitting 14, through the throat of the turbine head 12 (as indicated by the arrows T if FIG. 2) and is discharged into the atmosphere through vertical exhaust ports P located between adjacent turbine vanes.

Figure 3:
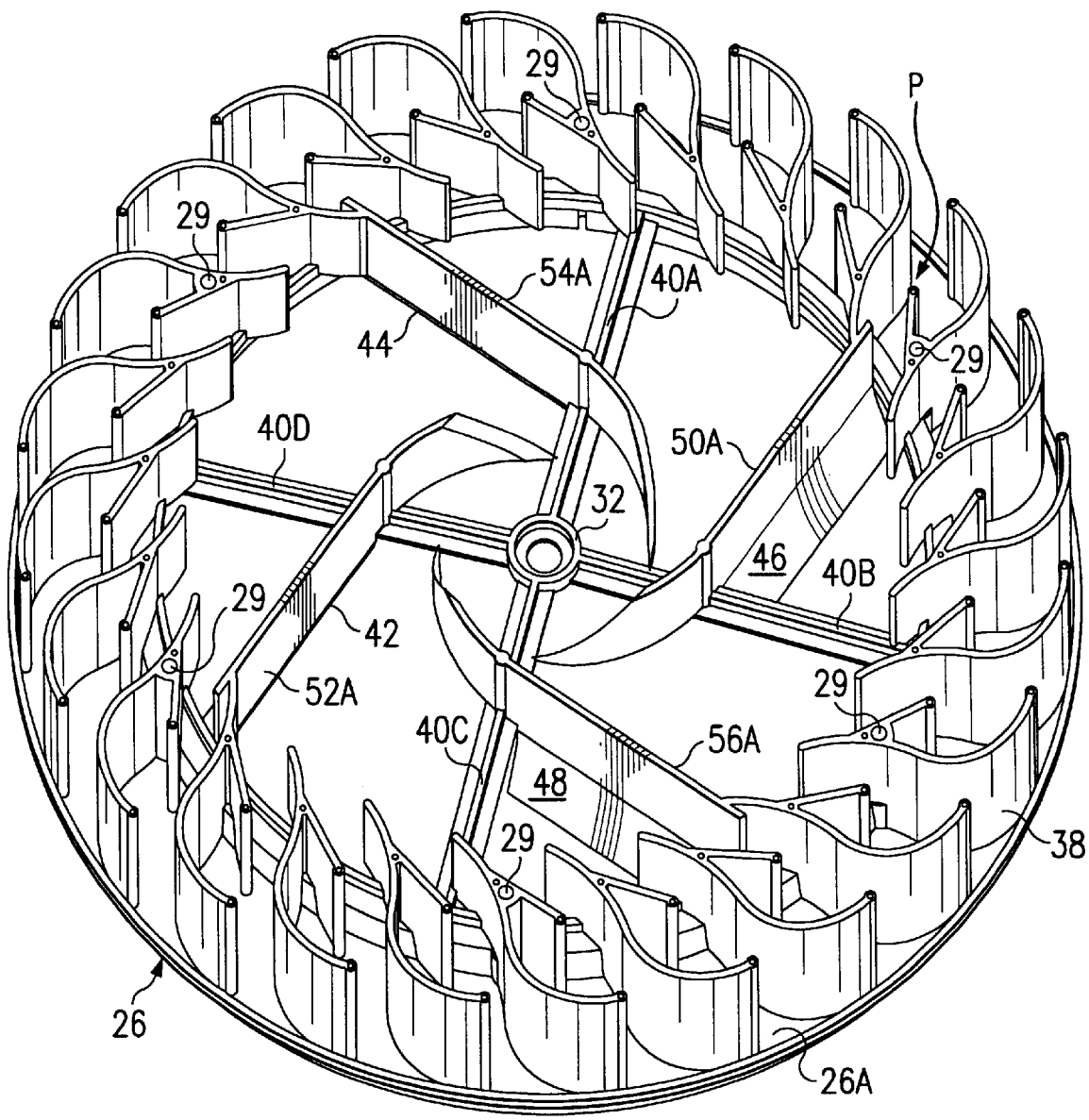
FIG. 3 is a perspective view of the lower head assembly of the turbine ventilator shown in FIG. 1.
Figure 4:
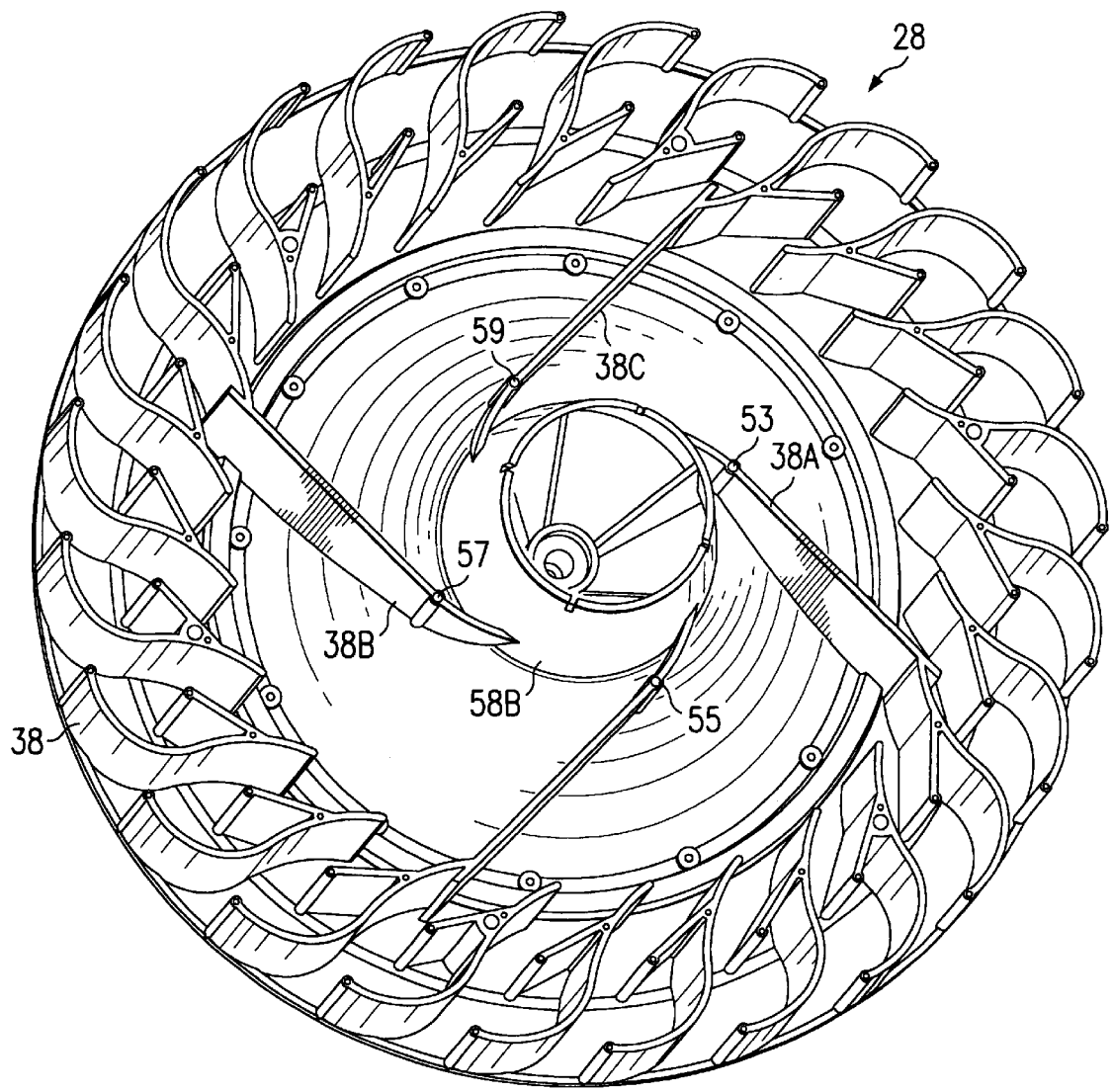
FIG. 4 is a perspective view of the upper head assembly of the turbine ventilator of FIG. 1.
Figure 8:
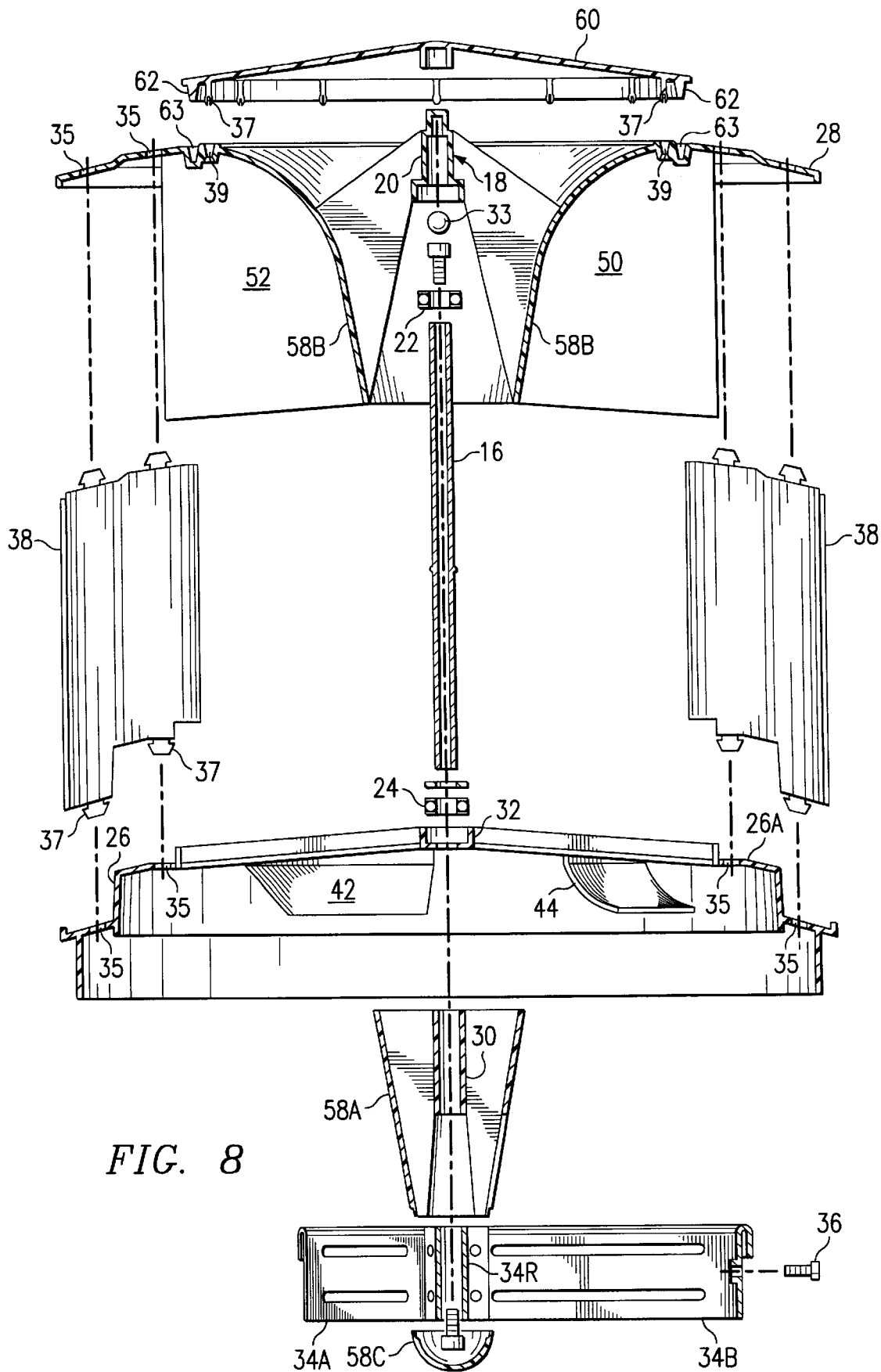
FIG. 8 is an exploded perspective view similar to FIG. 7 which illustrates an alternative turbine vane assembly.
Figure 9:
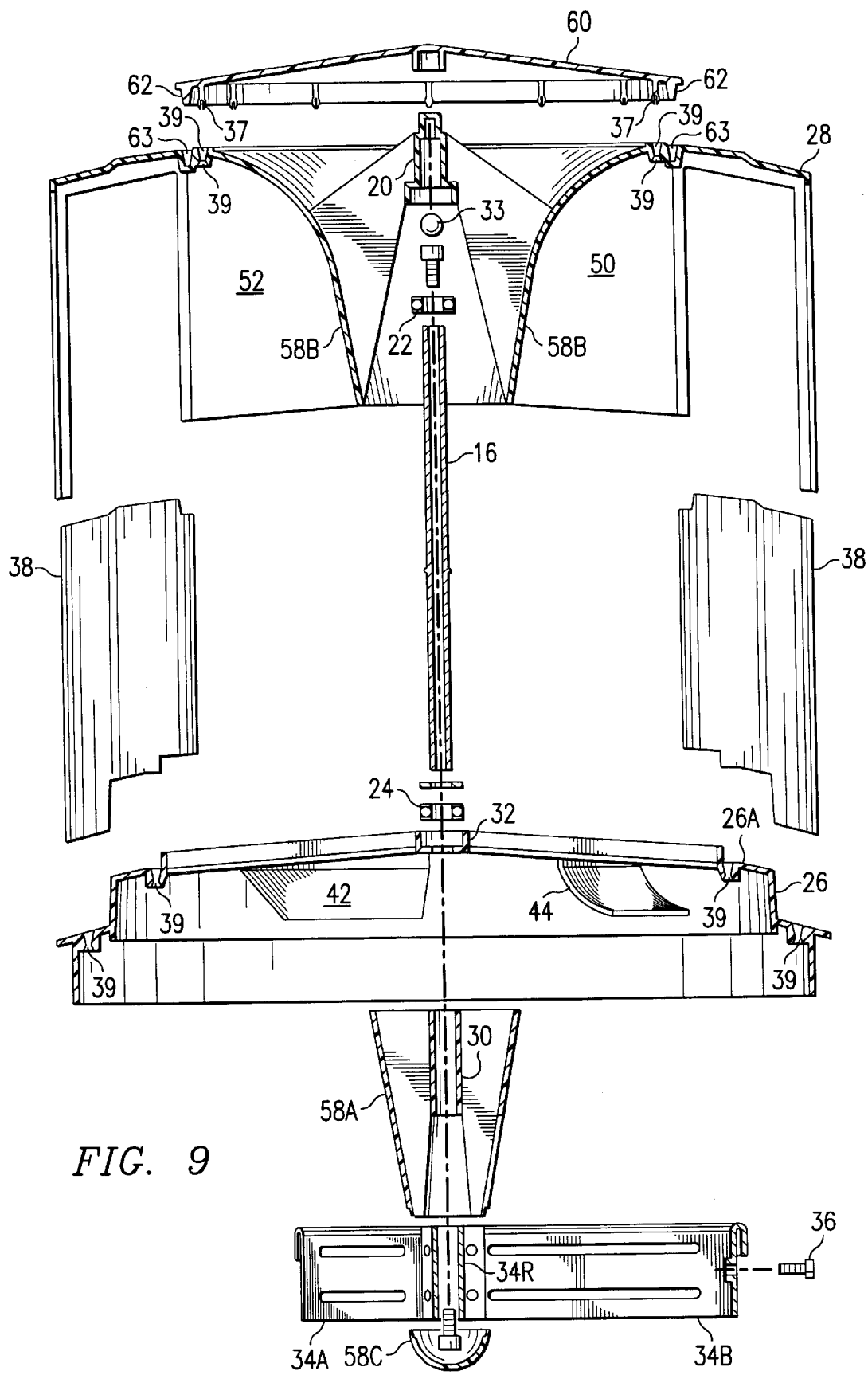
FIG. 9 is an exploded view, similar to FIG. 7, which illustrates yet another turbine blade assembly arrangement.

The turbine head 12 includes a base 26 and a crown 28. The thrust bearing receptacle 20 is attached to the crown 28, and is preferably integrally formed therewith. The lower bearing assembly 24 is mounted in a bearing cap 32. In the preferred embodiment, a bearing housing cup 32 is integrally formed with the turbine base 26, and receives the ball bearing 24. The thrust receptacle 20 is secured to the turbine crown 28 to receive the thrust end 16A of the spindle 16 and to rotatably support the turbine head 12 on a plastic or steel ball bearing 33 (FIG. 3, FIG. 8).

The lower end of the spindle collar 30 is supported on and engaged by a mounting bracket 34. The mounting bracket 34 is attached to the inside of the adjustable elbow fitting 14, and is attached on the upper end of the elbow conduit section 14B by sheet metal screws 36. The mounting bracket 34 includes radially extending support arms 34A, 34B and 34C which extend radially from a spindle retainer clamp flange 34R and are attached on the opposite ends to the inner sidewall of the adjustable elbow section 14B.

Referring now to FIG. 2, FIG. 3, FIG. 4 and FIG. 5, multiple vanes 38 extend between the turbine base 26 and the turbine crown 28. In the preferred embodiment, at least two or more of the vanes are integrally formed with the turbine base 26 or with the turbine crown 28. In the preferred embodiment, each vane includes two segments, a lower vane segment 38A which is integrally formed with the turbine base 26 and an upper vane segment 38B which is integrally formed with the turbine crown 28. According to this arrangement, the turbine crown with its integrally formed vane segments is fabricated by injection molding a plastic material such as polypropylene (P/P), and likewise the turbine base 26 with its integrally formed vane segments is fabricated of a plastic material by an injection molding process.

Figure 5:
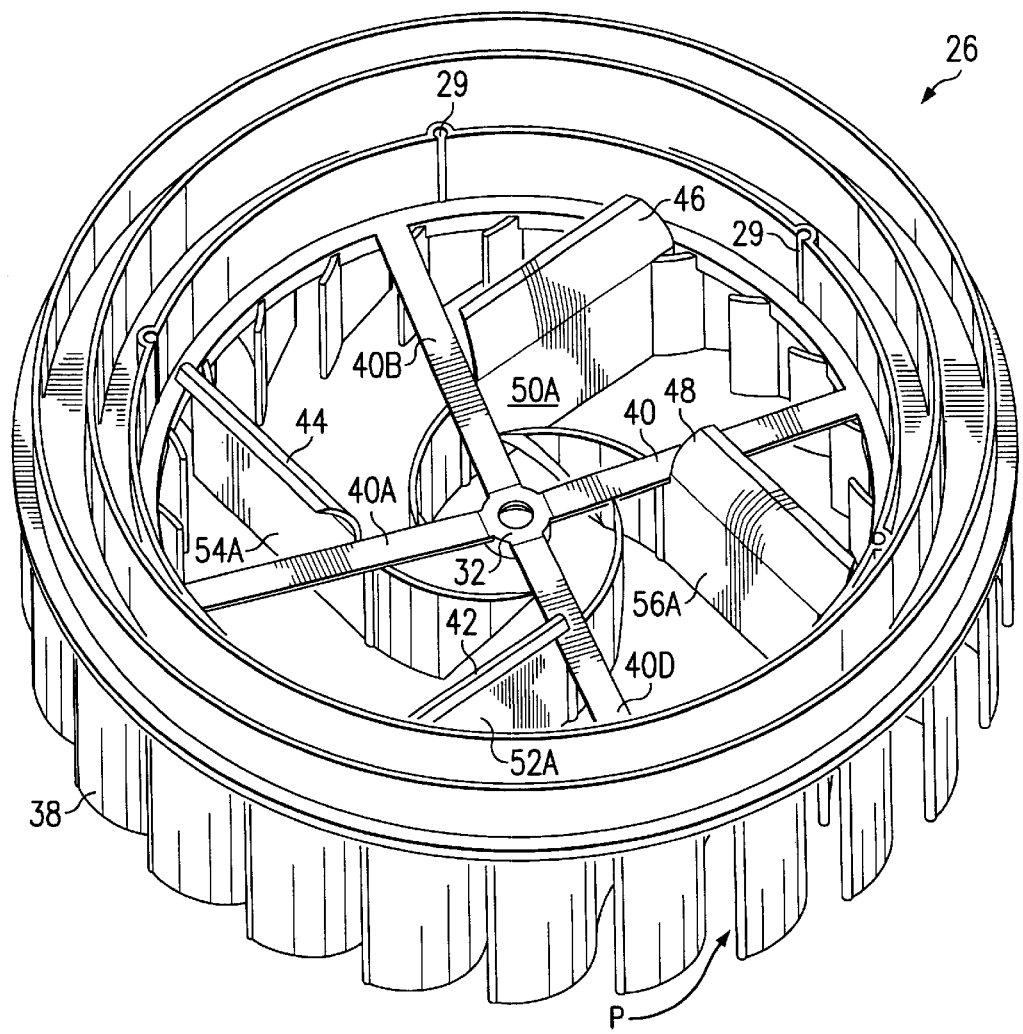
FIG. 5 is an underside perspective view of the lower head assembly shown in FIG. 3.

The vane segments 38A of the lower head assembly 26 and the vanes 38B of the upper head assembly 28 are assembled together in abutting relation, as shown in FIG. 2. Referring to FIG. 5, the turbine base is inverted, which reveals a series of drop-down slots 29 formed in the turbine base and which are aligned with comparable drop-down slots 31 formed in the crown member. The vane segments are assembled together with long threaded screw fasteners which are inserted into the drop-down slots.

In the preferred embodiment, all of the turbine vanes, or clusters of vanes including at least two or more vanes, are made in common with one another, for example as shown in FIG. 5. They are formed so that each vane is attached to another member, such as the turbine crown 28 of the turbine head. However, the attachment member, common to two or more vanes, is not limited to the turbine crown 28, but can be other members such as the turbine base 26, a vane-connecting ring, a series of spokes, a rib-like structure, a diffuser cone or any other common member that forms a part of the turbine assembly.

Where the vanes are integrally formed with the turbine crown 28, for instance, the vanes form a permanent portion of the crown, for example in a plastic molding process and do not require subsequent riveting or fastening. Thus, the invention eliminates the need for forty to fifty rivet fasteners, and an equal number of rivet setting operations. This economy of design and function of the invention is superior when compared to the laborious and expensive method of the vane attaching phase of the conventional method of wind turbine assembly. Separate handling of twenty or more individual vanes is also eliminated. According to this arrangement, the vanes 38 are treated as a modular unit, or modular units in the assembly process, and thus dramatically reduces assembly labor currently required by handling and attaching individual vanes.

Figure 7:
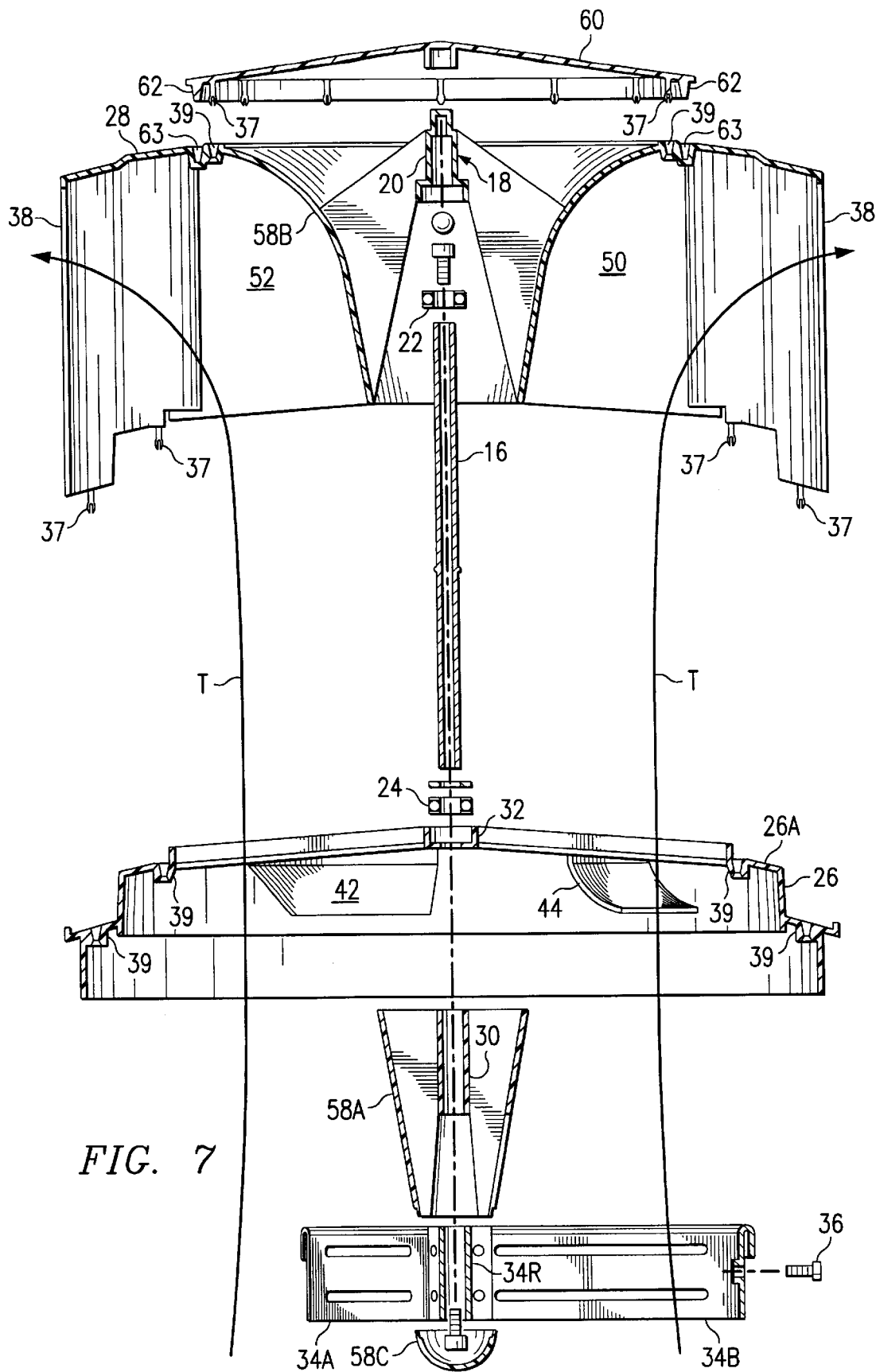
FIG. 7 is an exploded view, partially in section, of the turbine ventilator shown in FIG. 1.

According to another feature, the turbine base 26 is molded with contours so that it mates precisely with the lower extremity of the vanes 38 during assembly, and the vanes are held rigidly in place by the turbine base 26, as shown in FIG. 7. The modular nature of this embodiment provides that different connecting or engaging component members lend support to other adjoining members. The attachment of vanes 38 to the turbine base 26 can be completed by various methods, and is not confined to the use of metal or other fasteners such as rivets. The turbine base 26 can be attached to the upper turbine assembly, including the lower extremity of the vanes, by various types of fasteners such as screws 36, press-fit bosses or stud fasteners 37, various bonding methods including but not limited to adhesive bonding, chemical bonding and thermal welding.

The preferred assembly methods include those produced by electrically-operated equipment and/or systems that are commercially available from various companies, for example Branson Ultrasonics, Dukane Ultrasonics, Emabond Systems, Forward Technology Systems, and many others. Many of these systems are designed to excite the plastic molecule so that adjoining members undergo a flow and re-cooling, causing parts to bond so that two or more parts or members become permanently affixed. Laser technology is now being used in these instances.

Figure 10:
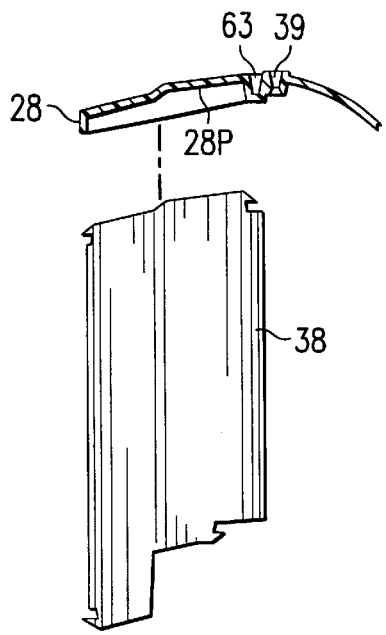
FIG. 10 is an exploded perspective view, partially broken away, of a turbine crown and vane assembly.
Figure 12:
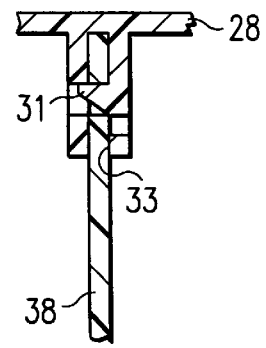
FIG. 12 is a sectional view, partially broken away, which illustrates the attachment of a vane with the fastener shown in FIG. 11; and, FIG. 13 is an exploded perspective view, partially in section and partially broken away, showing the assembly of a cluster of vanes to the turbine crown and the turbine base.
Figure 11:
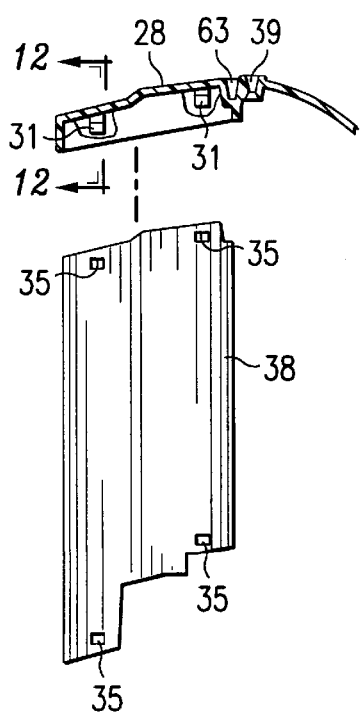
FIG. 11 is a view similar to FIG. 10 which illustrates an alternative vane assembly arrangement.
Figure 13:
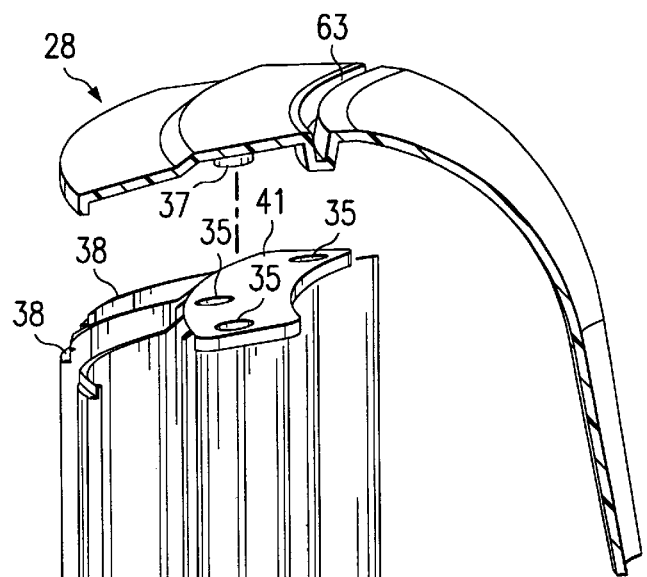

The invention also provides for a mechanical locking system of parts, such as locking the turbine base collar 26 to the vanes, by designing these parts with "snap-fit geometry" so that when they are pressed together, a mechanical lock of the parts is achieved, as shown in FIG. 7–FIG. 13. Plastics can deflect and bend as a member of one part (with a deflectable latch 31) passes through a channel 33 of the adjoining part, as shown in FIG. 11 and FIG. 12. Once the latch member is fully seated, it will snap back and provide components that are mechanically locked together in a fully functioning, stable assembly.

Additionally, the present invention provides for individual plastic vanes to be utilized within the turbine. While this method is not as efficient as the modular design, it is still superior to the method currently used in the manufacture of metal wind turbines which require many rivets and rivet setting operations. Individual vanes can be molded with female geometry such as holes 35 or sockets 39, or with male members such as bosses or studs 37 (see FIG. 13) In this embodiment, the corresponding mating surfaces, preferably on the turbine crown 28 and on the turbine base 26, also have mating bosses 37 and holes 35 for securing these individual vanes. For instance, one or more boss members 37 protrude downward from the underside of the turbine crown 28 to engage pre-formed holes 35 or pockets molded into a common attachment plate 41. Additionally, the turbine base 26 likewise includes one or more boss members 37 that protrude upward to engage pre-formed holes 35 or pockets molded into a lower common attachment plate 43. This precise engagement of the upper and lower ends of the vane(s) with other turbine members secure the vanes within the turbine assembly. If this securing is augmented by any of the other previously described attachment methods, including but not limited to bonding and mechanical attachment, the vanes are permanently fitted within the turbine assembly.

In other instances where bonding or mechanical attachment is not achieved in both the horizontal plane and the vertical plane, the mechanical attachment of the vane(s) can be achieved in the horizontal plane through this type of affixing. Other methods can complete the assembly in the vertical plane by the use of other fastening devices, such as a long screw fastener that joins the top with the base. In this particular assembly arrangement, the vanes are secured horizontally by one fastener, and secured vertically by other means. The vanes are positioned into the assembly along vertical lines, in a linear arrangement. Additionally, the vanes can be introduced into the assembly by being placed into the assembly from a horizontal plane and secured by overlapping members of the adjoining components forming an interlock. These interlocking members are provided by "snap-together" or "press-fit" coacting fasteners that are designed to provide a mechanical interlocking union of two components.

As an alternative to the plastic vane construction, the vanes can be constructed of thin aluminum or other lightweight metal, as shown in FIG. 10, in which fastening is achieved by a sharp, pointed barb punched into each corner of the metal vane, as shown in FIG. 10. In this arrangement, the barb configuration permits entry of the vane into the body of the plastic crown 28 as the barbs engage the side-walls of the crown member. The close tolerance fit of the vane within the crown receptacle allows a one-way entry with a very snug fit, but will not permit its removal, since the barbs sharp point will cut into the plastic in response to attempted removal. Thus, the metal vane will remain permanently lodged in the plastic crown member. Likewise, the turbine base 26 can have a similar configuration so that it too captures the metal vane securely with the barbs similarly located at the corners on the lower end of the vane. The metal vane is properly seated in the turbine assembly by precisely pushing it into place within a preformed pocket 28P formed in the crown or 26P formed in the base. The barb configurations in the vane prevents the vanes removal. The securing of individual metal vanes within the turbine is accomplished without the need for riveting as required by conventional all-metal construction wind turbines. Moreover, the barb structure could be located along the top and bottom edges of the vane, and are not necessarily required to be located on the vane corners.

In contrast to conventional metal roof-mounted wind turbines of all metal riveted construction, the turbine assembly of the present invention is modular. For instance, all of the vanes can be molded in common with the turbine base 26, and the turbine crown 28 is affixed to the upper extremities of the vanes during the assembly operations. Or a group or cluster of the vanes can be made in common with the turbine crown 28, while another group or cluster of the vanes are made in common with the turbine base 26, as illustrated in FIG. 2. For instance, if the vane's length is eight inches, a five-inch length segment of vane is attached to the turbine crown 28 and a three-inch length segment of vane is attached to the turbine base 26.

In this alternative embodiment, the vane segments are joined together in the vertical plane during the assembly operation, thus providing a vane length of eight inches. Or a certain number of the vanes are attached to the turbine crown 28 and a certain number of the vanes are attached to the turbine base 26. Or the vanes are formed in common with some or all of the vanes, but not formed in common with either the turbine crown 28 or the turbine base 26, and the crown and the base are both attached to the vanes during the turbine assembly. This alternative procedure is a rapid and economical method of assembly since only a few separate fasteners are required during assembly. And by using some of the optional attachment methods previously described, no fasteners may be required as noted with snap-together and press-fit geometry designed into the fastener components.

The turbine head 12 of the present invention is designed to prevent the entry of rain into the interior of the turbine and thus avoid dripping into the attic space. A driving rain will engage the spinning vanes thus preventing rain from entering the interior. As the rain runs down the vanes, it flows onto the base 26 of the turbine. This base 26 includes a floor portion 26A that is in the horizontal plane. The floor 26A has an outward sloping angle that drains the rain water to the outer perimeter of the spinning turbine, so that it drains out onto the shingles of the roof and away from the air exhaust port opening located within the interior of the turbine.

The molded turbine base 26 connects to the upper turbine assembly and securely engages each lower extremity of the vane members. Referring to FIG. 3 and FIG. 5, there are four radial brace members 40A, 40B, 40C and 40D that extend from the periphery of the turbine inwardly to close proximity of the spindle. These radial brace members support and add columnar strength extending from the stationary spindle 16 outward to the turbine periphery in the lower regions of the turbine assembly. Preferably, the radial brace members extend inwardly and terminate on the integral bearing cup 32 that accepts and securely engages either a ball bearing 24 or a separate bushing. Alternatively, the brace members may terminate in an integral bushing to engage the spindle directly. The spindle 16 is placed through the integral bearing cup during assembly of the turbine head 12. All of these components can be of one piece construction and integrally formed with the turbine base 26, adding to the economy of its overall modular design, as shown in FIG. 3.

By way of contrast, in conventional metal turbines, the radial brace members are separately stamped individual metal pieces that are riveted to a metal plate at the lower portion of the turbine's periphery, and extend inward to the spindle area. Additionally, separate punched metal plates are riveted to the metal radial members to house a ball bearing assembly or bushing components. The spindle is inserted through the bushing or ball bearing. In all, there are four or more stamped metal pieces that are held in place with nine rivets. The molded base 26 of the present invention does not require such metal pieces or rivets.

The present invention allows for design variations relating to the radial or rib-like members that span the turbine periphery and the stationary spindle in the lower region of the turbine, and are integral to the turbine base 26. For example, the radial support function can be provided by other functional elements within the turbine, such as the air scoop blades. According to one embodiment, the air scoop blades span the distance between the periphery and the turbine interior and attach either directly or through other integral members such as the radial brace members 40A, 40B, 40C and 40D as shown in FIG. 3, with the stationary spindle.

Additionally, some of the vane members extend inwardly to the interior of the turbine and directly or indirectly engage the stationary spindle as shown in FIG. 3. This inward extension of some of the vane members may change from a vertical profile member to more of a horizontal profile member, with an angled pitch. And in this arrangement, these inwardly extended vane members serve the function of the air scoop blades or fan pulling exhaust air from below-roof areas as the turbine rotates in the wind. This inwardly extension of the vane is preferably integral to the vane's construction. If the inwardly extended vanes directly or indirectly engage the stationary spindle, it may eliminate the requirement of having the attached base member attached to the spindle through such means as a bushing, a bushing assembly or a ball bearing assembly.

For enhanced performance, a series of air scoop fan blades 42, 44, 46 and 48 are integrally molded into the base collar 26. The function of the air scoop blades is to rotate as the turbine 12 rotates, thus pulling air from the attic space. The air scoop blades derive their rotating power from the wind energy, engaging the multiple vanes 38 on the turbine. Thus, as the turbine turns from this harnessed wind power, so do the internal air scoop blades as they rotate around the spindle 16. These blades turn within the confines of the turbine. As a variation, these air scoop blades can revolve whereby a portion of the air scoop blades are turning within the confines of the turbine, and a portion of the air scoop blades are turning within the confines of support structures such as the adjustable, elbow air flow conduit 14.

As a variation of this optional feature, a separate air scoop assembly component is included within the turbine assembly and is not necessarily formed integral to the turbine base 26. It attaches to the base collar 26 or to the vane members during the assembly. As a variation, the air scoop assembly is supported directly by the spindle member 16, and not carried by the rotating turbine assembly. Furthermore, the air scoop assembly could be linked to some of the rotating members and derive its energy for rotating through this linkage such as being linked to the base collar 26, for example.

In another embodiment, individual air scoop blades are made as separate members and attached to the turbine base 26, or other turning structure members within the turbine assembly. In this embodiment, an important difference is that the air scoop blades are integrally molded with the base collar 26, and separate components, such as the angled portion of the air scoop blade are separately attached. This is easily accomplished by any of the attachment methods, as well as by snap-together fastener components.

On hot days when there is little or no ambient wind to cause the traditional wind turbines to rotate, the air scoop blades play a secondary enhancement role. The air scoop blades are angled such that hot air rising from the attic, through the-adjustable roof mounted air flow conduit, flows across them. With the angle of these air scoop blades, the force of the rising hot air induces a turning moment in the turbine. This causes the turbine 12 to rotate slowly in the preferred direction of rotation. While this rotation may not be fast enough to provide the primary air scooping function in promoting the exhausting of hot attic air, it does provide the desired secondary function of breaking the inertia of the roof mounted turbine. This allows the turbine to respond to the slightest of breezes by rotating, while other turbines are not rotating, since the turbine does not already overcome its at-rest inertia.

The present invention provides for the optional novel feature of incorporating vertical quadrant section panels 50, 52, 54 and 56 within the confines of the turbine's interior. These section panels are rising vertical extensions that are continuations of the air scoop blades located in the lower region of the turbine. These section panels extend upward and terminate in the top region of the turbine. Thus, the rising exhaust air is partitioned into one of a limited number of these vertically oriented chambers or quadrants, which are instrumental in distributing exhaust air evenly and uniformly to the turbine's exhaust ports located vertically between the vane members.

The rising air is guided along the boundaries of these vertically orientated quadrant section panels adding to the positive air flow associated with an increase in the negative air pressure inherent with this turbine design. As a variation, these section panels are included within the turbine's interior, yet are independent of any air scoop blade structure and still perform the desired function and increase the efficiency of the wind turbine ventilator.

Another novel feature of my turbine ventilator is that it contains an internal exhaust air diffuser 58. The purpose of the internal diffuser is to direct air that rises through the turbine causing it to move in close proximity to the vane members. In one form the exhaust air diffuser 58 can be a cone-type component that has a smaller diameter, and may be somewhat pointed, in the lower region of the turbine. The diffuser component's diameter increases as it rises through the turbine's interior to the top or crown member. Preferably, this diffuser is a separate component, or it can be produced in common with other turbine members, such as the vane members and/or the top or crown member.

In this embodiment whereby a diffuser cone 58 spans much or all of the internal height of the turbine, much of the spindle member is located within the diffuser component confines. The exhaust diffuser 58 can rotate with the turbine assembly or it can remain stationary. Additionally, a portion of the diffuser can rotate with the turbine and a portion of the diffuser may remain stationary. According to one aspect of this arrangement, the diffuser is molded and is integrally formed with the turbine crown 28, the vane members 38, and the cup 20 that contains the ball bearing, and/or the bushing in the upper region of the turbine.

The function of the exhaust air diffuser 58 is to provide the turbine interior with an encroaching boundary for the transient exhaust air rising through the turbine. In performing this function, as air rises through the turbine throat upwardly, it is also moved in closer and closer proximity to the vane member's exhaust ports, thus preventing exhaust air from accumulating within the turbine confines. This not only expedites the ultimate exhausting of this hot air, but also introduces a much greater amount of positive airflow and negative air pressure. As the exhaust air moves through the constricting path, which forms a venturi passage, it accelerates and this causes other air that may be following the same path to also move faster to displace air that has been discharged. This results in air being pulled from the under the roof confines at a faster rate.

The exhaust air diffuser 58 can be of alternative configurations. For instance, it can have a cylindrical profile instead of a conical profile. The walls of the diffuser can be continuous. The walls can also be non-continuous, such as multiple members that act in concert to diffuse air. The diffuser can be made integral with the turbine crown 28, the vanes 38, the uppermost bearing or bushing housing component or the turbine base 26.

The wind turbine assembly 10 provides (1) a conservation of processes in the manufacturing and assembly through my modular plastic design, and (2) performance enhancements never before included in conventional roof-mounted wind turbine ventilators. Both the air scoop blade feature and the internal air diffuser feature are best realized in a modular plastic construction, these features could also be included in conventional metal wind turbines with the inclusion of the air scoop blades and/or an internal exhaust air diffuser.

Figure 6:
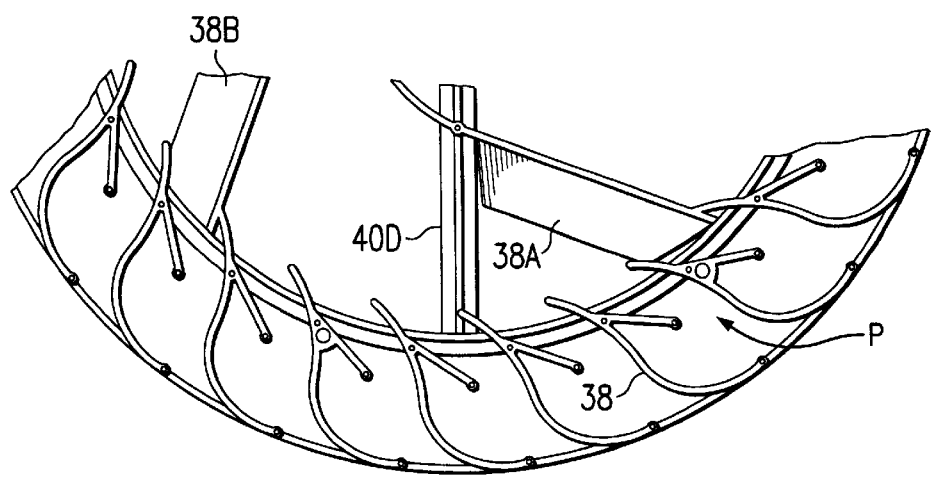
FIG. 6 is a top plan view, partially broken away, of the lower head assembly shown in FIG. 3.

In conventional metal wind turbines, the vanes are shaped metal pieces stamped from flat sheets of steel or aluminum. Thus, the profile of these vanes are of a continuous shape that may have a formed ridge or a bend. They do not have a distinctively different element whereby one wall portion may branch from another wall portion. The vane 38 of the present invention is a multifunction vane, whose design elements totally separates the two distinct functions unlike any vane on any other wind turbine. This is accomplished by providing a vane wall element that branches away from the main vane wall in a modified "Y" profile, as shown in FIG. 6.

In doing this, and so positioning these vanes in the turbine, the "V" portion of the vane that branches off from a main member serves primarily to catch and capture the ambient wind for maximum torque. The other continuous wall portion of the vane serves primarily to provide a smooth exit path for the exhaust air egress of the rotating wind turbine. By designing turbine vanes that are molded and not merely stamped from flat sheets, the vane components can be formed to yield greatly improved and enhanced function. The vane configuration can also utilize a simpler designed vane, if preferred.

The molded vanes may also contain elements such as pins, bosses and chambers and pockets that are not found in metal vanes. These may be integral to the molded vane. In these instances, vane portions can interlock and or stabilize other vane portions in the final assembled product. For instance, if vane portions are to connect or mate with other vane portions to form a continuous longer vane member, some of my vanes may include male bosses or elements that bridge and/or insert into chamber-like areas or elements on the mating vane portion and thereby stabilize them to (1) insure and maintain a proper alignment of vane portions, and (2) restrict unwanted movement of vane members, and (3) provide a positive locking means utilizing any commonly accepted attachment methods.

This arrangement of structural elements such as bosses, pins, chambers, snap-latch members and the like may equally apply to full length vanes that are being secured to other turbine components such as the base, or top (crown) member. These highly functional wind turbine vanes are a dramatic departure from other wind turbine vanes, and do not rely on rivet fasteners to secure them to adjoining turbine components.

Plastic assemblies or components that are exposed to sunlight over time, may degrade and loose some of their physical integrity due to their reaction to the sun's ultraviolet rays. Plastic additives that retard this degradation by the sun are commercially available from companies such as Ciba Specialty Chemicals Corporation, and are often added to plastic resin before plastic parts are formed. Through the addition of these additives the functional life of plastic products can be extended greatly. In my wind turbine one of the areas that receives the greatest amount of sun rays is the top (crown). Additionally, this is an area of the turbine that receives the most stress since it is the top that inventories much of the turbine weight and transfers the weight onto the stationary spindle.

One feature of this turbine embodiment is that the turbine areas that inventory the weight in the area of the upper spindle is sub-surface with a separate crown cover 60 that receives the direct sun rays. While this attachable crown cover encloses and protects the turbine, it adds only a minor amount of weight to the turbine. The underside of the crown cover does not engage the weight bearing areas. Thus, this separate crown cover absorbs or reflects the sun rays and at the same time protects and shields the separate turbine components below from receiving sun rays.

The crown cover 60 is attached to the turbine by snap-together fastener components such as molded latch elements. It can also be attached by many other methods including fasteners, bonding, etc. As an alternate configuration, the spindle through bushings or bearings could engage the crown member, and not rely on other members to inventory the weight of the turbine.

According to another aspect of the attachable crown cover, it includes a ring seal 62 on the underside that may insert into a channel 63 to prevent rainwater from seeping into the inner compartments below the top.

An external concave surface on the diffuser section will help to orient the flow in the radial direction. The flow will follow the boundary thus making a concave section shape inherently orient the flow radially rather than axially.

Referring to FIG. 3, FIG. 7, FIG. 8 and FIG. 9, straight section quadrant panels 50, 52, 54 and 56 on the diffuser improve the transfer of wind energy to the flow by imposing a circumferential velocity on the fluid. The circumferential velocity will impose a radial centrifugal force aiding in the pumping of the air out of the attic. These quadrant guide panels should be a continuation of the turbine vanes. Each quadrant guide panel starts on the diffuser and extends out to the exit of the turbine vanes.

The quadrant section panels shown in the embodiment of FIG. 2 are each formed by two sections, for example a lower section 50A and an upper section 50B on the right and a lower section 52A and an upper section 52B on the left as viewed in FIG. 2. The lower quadrant panel sections 50A, 52A are integrally formed with the turbine base 26, and the upper quadrant panel sections 50B, 52B are integrally formed with the diffuser cone section 58B. The guide panel sections abut along a common line on each side, and the union is stabilized by interlocking pin 53, 55, 57 and 59.

The vane segments 38A, 38B are also assembled together in abutting relation in a similar manner, and the union is also stabilized by pins 23, 25, for example as shown in FIG. 2.

Although the invention has been described with reference to certain exemplary arrangements, it is to be understood that the forms of the invention shown and described are to be treated as preferred embodiments. Various changes, substitutions and modifications can be realized without departing from the spirit and scope of the invention as defined by the appended claims.

What is claimed is:

1. A wind turbine ventilator assembly comprising, in combination:
   a mounting bracket adapted for attachment to a roof-mounted air flow conduit;
   a turbine head coupled to the mounting bracket for rotation about an axis, the turbine head including:
   a base member;
   a crown member;
   multiple vanes extending between the base member and the crown member; and,
   a plurality of vertical section panels mounted on the turbine head and located within the turbine interior air flow passage, the vertical section panels partitioning the turbine air flow passage to distribute the flow of exhaust air substantially evenly through exhaust ports located between adjacent vane members.

2. A wind turbine ventilator assembly comprising, in combination:
   a mounting bracket adapted for attachment to a roof-mounted air flow conduit;
   a turbine head coupled to the mounting bracket for rotation about an axis, the turbine head including:
   a base member;
   a crown member;
   multiple vanes each attached on opposite ends to the crown member and to the base member, respectively, each vane, the crown member and the base member including coacting male and female fastener portions that are joined together in interlocking relation, respectively, wherein the male and female fastener portions have snap-together interlocking geometry.

3. A wind turbine ventilator assembly as set forth in claim 2, wherein each vane is made of a metal material selected from the group consisting of aluminum and galvanized steel.

4. A wind turbine ventilator assembly as set forth in claim 2, wherein each vane is made of plastic material.

5. A wind turbine ventilator assembly as set forth in claim 2, wherein the female fastener portion comprises a slot, and the male fastener portion comprises a deflectable latch that is insertable into the slot.

6. A wind turbine ventilator assembly as set forth in claim 2, wherein the vanes are integrally formed together in a cluster of two or more vanes and are attached between the crown and the base.

7. A wind turbine ventilator assembly as set forth in claim 2, wherein air discharge ports are formed between adjacent vanes and said air discharge ports have a constant air flow area from top to bottom.

* * * * *